Figure 1:
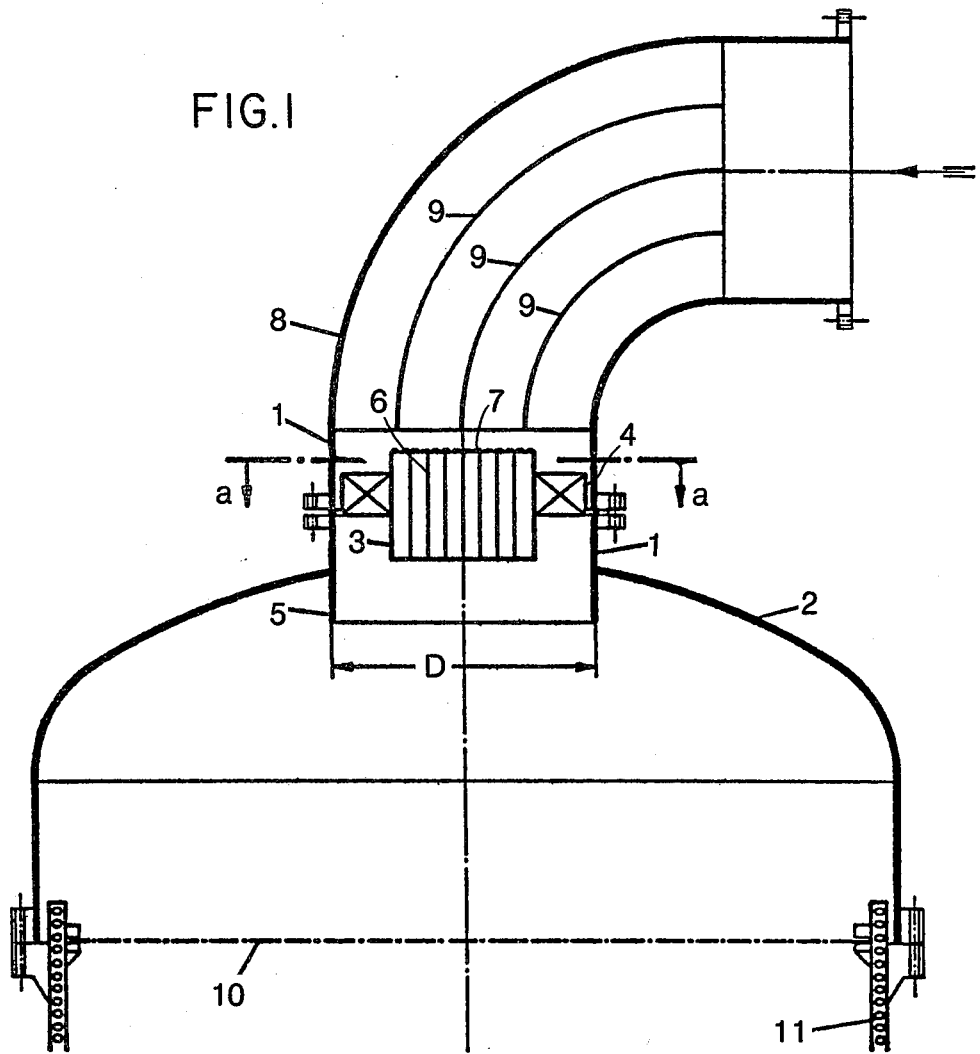

United States Patent [19]

Coulon et al.

[11] Patent Number: 4,471,821

[45] Date of Patent: Sep. 18, 1984

[54] APPARATUS FOR DISTRIBUTING A GAS, COMING FROM A PIPE, OVER THE CROSS-SECTION OF A VESSEL

[75] Inventors: Guenter Coulon, Mannheim; Wolfgang Leuckel, Bad Durkheim, both of Fed. Rep. of Germany

[73] Assignee: BASF Aktiengesellschaft, Ludwigshafen, Fed. Rep. of Germany

[21] Appl. No.: 522,596

[22] Filed: Aug. 12, 1983

Related U.S. Application Data

[63] Continuation of Ser. No. 282,662, Jul. 13, 1981, abandoned.

[30] Foreign Application Priority Data

Jul. 24, 1980 [DE] Fed. Rep. of Germany .. 3028003

[51] Int. Cl.$^3$ .............................................. B65B 3/04
[52] U.S. Cl. .................................. 141/286; 239/472; 422/220
[58] Field of Search ........................ 141/1–12, 141/37–70, 285–310, 392; 239/406, 472; 422/176, 220, 310

[56] References Cited

U.S. PATENT DOCUMENTS

| 2,438,242 | 3/1948 | Watson | 23/288 |
| 3,597,166 | 8/1971 | Hochman | 23/288 |
| 3,685,971 | 8/1972 | Carson | 422/220 |
| 3,713,588 | 1/1973 | Sharpe | 239/400 |
| 3,917,173 | 11/1975 | Singh | 239/406 |
| 4,126,539 | 11/1978 | Derr et al. | 208/108 |

FOREIGN PATENT DOCUMENTS

| 2160372 | 11/1974 | Fed. Rep. of Germany . |
| 2429951 | 1/1975 | Fed. Rep. of Germany . |
| 702776 | 1/1931 | France . |
| 2282000 | 12/1976 | France . |
| 1190282 | 6/1967 | United Kingdom . |

Primary Examiner—Houston S. Bell, Jr.
Attorney, Agent, or Firm—Keil & Weinkauf

[57] ABSTRACT

Apparatus for distributing a gas, coming from a pipe, over the cross-section of a vessel whose diameter is many times greater than the pipe diameter, in particular for distributing the ammonia/air mixture from the catalytic oxidation of ammonia, wherein the entry pipe is equipped with a concentric inner pipe and internal fitments for creating a vortical motion are provided in the annular space between the entry pipe and the inner pipe.

8 Claims, 3 Drawing Figures

U.S. Patent  Sep. 18, 1984  4,471,821 a-a

APPARATUS FOR DISTRIBUTING A GAS, COMING FROM A PIPE, OVER THE CROSS-SECTION OF A VESSEL

This is a continuation of Ser. No. 282,662, filed July 13, 1981, now abandoned.

The present invention relates to apparatus for distributing a gas, coming from a pipe, over the cross-section of a vessel whose diameter is many times greater than the pipe diameter, in particular for distributing the ammonia/air mixture from the catalytic oxidation of ammonia.

Nitric acid is manufactured industrially by catalytic oxidation of ammonia with atmospheric oxygen to nitric oxide. Platinum gauze is used as the catalyst. The reaction temperature is from 830° to 960° C. The ammonia oxidation is followed by a waste heat system— in general even in the same vessel—for utilizing the very substantial heat of reaction.

The ammonia/air mixture in general passes from a pipe via a hood into a cylindrical reactor zone in the upper part of which the platinum gauze is clamped to extend over the entire cross-section of the vessel. The hood consists of a widening section—for example in the shape of a cone or domed end-plate—and a cylindrical transition section.

It is known that uniform impingement of the gas stream on the gauze assembly assists the achievement of a good yield. Uniform entry flow into the hood is achieved in a conventional manner by suitably dividing up the pipe bend cross-section with guide plates. It is furthermore conventional practice to provide one or more perforated plates in the cylindrical transition section of the hood. Very commonly, one or more concentric cones, with taper angle increasing in the outward direction, are provided at the hood entry. A design of this type is described in U.S. Pat. No. 3,597,166. However, experiments with such prior art cones have shown that in each annular channel the flow breaks up in the circumferential direction and concentrates in $\frac{1}{3}$ to $\frac{1}{4}$ of the periphery of the annular channel, so that it exits in a jet-like manner at the end of the annular channel.

The fitting of perforated plates in the cylindrical transition section—either as a sole measure or in conjunction with flow guide cones in the widening section—has also presented problems. It is true that if the obstruction ratio was sufficiently high, the pressure drop produced resulted in uniform flow through the perforations, but the flow showed a pronounced tendency to collect in pulsing bundles in the delay zone downstream of the perforated plate, thus resulting in nonuniform instantaneous flow distribution over the cross-section, with local backflow. In the case of the oxidation of ammonia, this can result in NO being transported back to the platinum gauze and reacting with uncombusted $NH_3$ to give nitrogen, so that the yield of NO is reduced.

Furthermore, internal fitments, for example perforated plates, inside the hood have the disadvantage that they rise to 300°-500° C. and thereby act as catalytic surfaces which assist the pre-combustion of $NH_3$ to nitrogen. Furthermore, platinum dust, raised from the gauze by backflow, can settle on such fitments.

It is an object of the present invention to ensure that the flow through the platinum gauze is very uniform and substantially free from backflow, and at the same time to avoid the use of internal fitments in the hood.

We have found that this object is achieved, according to the invention, if the entry pipe is equipped with a concentric inner pipe and internal fitments for creating a vortical motion are provided in the annular space between the entry pipe and the inner pipe.

Figure 2:
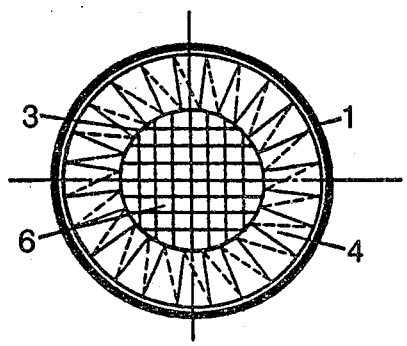
Figure 3:
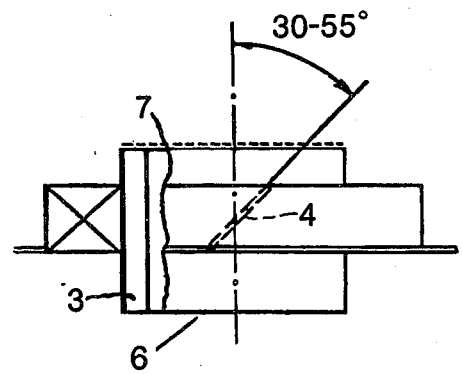

An embodiment of the invention is discussed in more detail below in relation to the drawings. In the latter:

FIG. 1 diagrammatically shows an axial section of the upper part of an ammonia combustion furnace, into which the flow distribution according to the invention has been fitted;

FIG. 2 shows a cross-section at a—a in FIG. 1 with a plan view of the flow distributor; and FIG. 3 shows a partial section parallel to the axial section in FIG. 1 with a side elevation of one of the guide vanes.

The gas flow enters the hood 2 in a conventional manner via a pipe bend 8 equipped with guide plates 9, and via a short straight entry pipe 1, and then passes into the cylindrical part of the reactor. The Pt gauzes 10 are installed at the end of the hood. After reaction over the Pt gauzes, the hot gases enter the waste heat section 11, connected to the hood via a pair of flanges; of this waste heat section, FIG. 1 only shows the upper end, with the start of the pipe system in the walls, which is employed for thermal protection of the sides of the vessel.

The underlying concept of the novel flow distributor is to employ internal fitments present solely in the cold entry pipe 1 to produce a type of remote control of the flow up to the gauze. For this purpose, the flow in the entry pipe is sub-divided by a concentric inner pipe 3 and the outer stream has a vortical impulse imparted to it by means of a ring of guide vanes 4 inserted into the annular space between the entry pipe and the inner pipe. The combination of the vortical outer stream with axial core flow ensures that the flow makes stable contact with the hood wall without a backflow zone being set up along the reactor axis.

To impart a vortical motion to the outer stream, it has proved advantageous to insert a ring of guide vanes 4 into the annular space between the entry pipe and the inner pipe.

The angle of attack of the guide vanes relative to the flow impingement direction should be from 30° to 55°, depending on the angle of divergence of the flow. In order to prevent the flow from proceeding along one side of the hood wall, with backflow on the opposite side, it is advantageous if the entry pipe protrudes into the vessel, forming a breaker edge 5. Instead of directing the core flow axially by means of a honeycomb bundle 6 running in the axial direction, the core flow can also be provided with a slight vortical motion, to assist stabilization. The guide vanes which must then be inserted in the core pipe in place of the flow-smoothing honeycomb, must be at an angle of attack of not more than 15° to avoid backflow along the reactor axis. In order to balance the ratio of the gas streams in the inner pipe and in the annular space it is necessary to provide a flow resistance, for example a screen 7, at the entry end of the inner pipe.

In a further advantageous embodiment of the invention, the ratio of the diameter of the inner pipe to the diameter of the entry pipe is from 0.4 to 0.7. The distance from the end of the inner pipe to the end of the entry pipe should be from 0.1 to 0.5 times the diameter of the entry pipe. This results in an interlocking of the core flow and outer flow before entry into the hood.

In the case of the catalytic oxidation of ammonia, the advantage, over the prior art, of fitting the flow distributor according to the invention is in the main that as a result of uniform and backflow-free distribution of the reaction gas over the platinum gauzes, the yield is increased. A further advantage is that by dispensing with internal fitments in the hood section and eliminating backflow, operating problems resulting from blowback are avoided.

We claim:

1. In an apparatus for the catalytic oxidation of ammonia, said apparatus comprising a reaction vessel and an entry pipe introducing the ammonia/air mixture into the vessel from above, said vessel having a diameter many times greater than the entry pipe diameter and having platinum gauze installed therein to extend over the entire cross section of the vessel, an arrangement for distributing the ammonia/air mixture over the platinum gauze uniformly and substantially without backflow, in which arrangement the entry pipe is equipped with a concentric inner pipe so that an annular space is formed between the entry pipe and the inner pipe, and a ring of guide vanes is provided in said annular space which are circumferentially spaced with respect to each other and have a predetermined angle of attack to the flow direction for creating vortical motion.

2. Apparatus as claimed in claim 1, wherein the angle of attack of the guide vanes (4) to the flow direction is from 30° to 55°.

3. Apparatus as claimed in claim 1, wherein the entry pipe (1) protrudes into the vessel, to form a breaker edge (5).

4. Apparatus as claimed in claim 1, wherein the concentric inner pipe (3) is provided with a core flow directing means (6) oriented substantially in the axial direction.

5. Apparatus as claimed in claim 1, wherein a flow resistance (7), for example in the form of a screen, is provided at the entry end of the inner pipe (3).

6. Apparatus as claimed in claim 1, wherein the ratio of the diameter of the inner pipe (3) to the diameter of the entry pipe (1) is from 0.4 to 0.7.

7. Apparatus as claimed in claim 1, wherein, viewed in the flow direction, the distance from the end of the inner pipe (3) to the end of the entry pipe (1) is from 0.1 to 0.5 times the diameter of the entry pipe.

8. Apparatus as claimed in claim 4, wherein said core flow directing means is in the form of a honeycomb bundle.

* * * * *